United States Patent
Lee et al.

(10) Patent No.: US 10,673,031 B2
(45) Date of Patent: Jun. 2, 2020

(54) SECONDARY BATTERY

(71) Applicant: LG Chem, Ltd., Seoul (KR)

(72) Inventors: Han Young Lee, Daejeon (KR); Song Taek Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/188,818

(22) Filed: Nov. 13, 2018

(65) Prior Publication Data

US 2019/0198827 A1 Jun. 27, 2019

(30) Foreign Application Priority Data

Dec. 21, 2017 (KR) .................. 10-2017-0177277

(51) Int. Cl.
*H01M 2/02* (2006.01)
*H01M 2/08* (2006.01)

(52) U.S. Cl.
CPC ....... *H01M 2/0292* (2013.01); *H01M 2/0267* (2013.01); *H01M 2/0275* (2013.01); *H01M 2/0287* (2013.01); *H01M 2/08* (2013.01); *H01M 2200/20* (2013.01); *H01M 2220/20* (2013.01); *H01M 2220/30* (2013.01)

(58) Field of Classification Search
CPC . H01M 2/345; H01M 2/0267; H01M 2200/20
See application file for complete search history.

(56) References Cited

U.S. PATENT DOCUMENTS

| | | | |
|---|---|---|---|
| 4,610,370 A * | 9/1986 | Patterson | B65D 83/70 220/203.08 |
| 5,614,217 A * | 3/1997 | Chiprich | A61K 9/4816 424/451 |
| 5,714,277 A * | 2/1998 | Kawakami | H01M 2/1686 429/129 |
| 2003/0008088 A1 | 1/2003 | Matsubara et al. | |
| 2006/0099510 A1* | 5/2006 | Naarmann | H01M 4/0404 429/232 |
| 2013/0171483 A1* | 7/2013 | Shibata | H01M 2/12 429/56 |
| 2015/0093635 A1* | 4/2015 | Grimminger | H01M 10/052 429/188 |
| 2016/0133883 A1* | 5/2016 | Hwang | H01M 2/0292 429/176 |
| 2016/0172716 A1* | 6/2016 | Baylard | H01M 2/1241 429/56 |
| 2019/0115592 A1* | 4/2019 | Takeda | H01M 4/366 |

FOREIGN PATENT DOCUMENTS

| | | | | |
|---|---|---|---|---|
| JP | 10-270084 | * | 10/1998 | ........... H01M 10/40 |
| JP | 2002-056823 A | | 2/2002 | |
| JP | 4030427 B2 | | 1/2008 | |
| KR | 10-2016-0039875 A | | 4/2016 | |

(Continued)

*Primary Examiner* — Jeremiah R Smith
(74) *Attorney, Agent, or Firm* — Lerner, David, Littenberg, Krumholz & Mentlik, LLP

(57) ABSTRACT

A secondary battery is provided. The secondary battery includes an electrode assembly, a case that accommodates the electrode assembly, and a protection member disposed within the case. The protection member includes a curing promoter, an adhesive, and a protective film that separates the curing promoter and the adhesive.

12 Claims, 4 Drawing Sheets

(56) References Cited

FOREIGN PATENT DOCUMENTS

| KR | 20160066202 A | * | 6/2016 | ............ H01M 10/04 |
|---|---|---|---|---|
| KR | 10-1702071 B1 | | 2/2017 | |
| KR | 10-2017-0045976 A | | 4/2017 | |
| KR | 20170046330 A | * | 5/2017 | ............ H01M 10/42 |
| WO | 0217413 A1 | | 2/2002 | |

* cited by examiner

# SECONDARY BATTERY

CROSS REFERENCE TO RELATED APPLICATION

This application claims the benefit of Korean Patent Application No. 10-2017-0177277 filed on Dec. 21, 2017, the disclosure of which is herein incorporated by reference in its entirety.

TECHNICAL FIELD

The present invention relates to a secondary battery having improved safety.

RELATED ART

As technology develops and demand for mobile devices increases, demand for a secondary battery as an energy source is rapidly increasing. Accordingly, research on the secondary battery capable of meeting various requirements have been conducted. The secondary battery is attracting much attention as an energy source for power devices such as electric bicycles, electric vehicles, and hybrid electric vehicles as well as mobile devices such as mobile phones, digital cameras, and notebook computers.

In recent years, attempts have been made to apply various materials to develop secondary batteries having improved performance in view of high energy density, long life, durability, and the like. However, even in the case of a secondary battery having such improved characteristics, occurrence of internal gas in an environment of high potential and high temperature storage remains to be a problem. The occurrence of the gas increases or decreases an inner volume of the secondary battery. This increase or decrease in the volume of the internal structure causes pressure on other components, and the generated pressure leads to physical impacts on other components of the secondary battery, which results in degraded functionality of the secondary battery or an explosion thereof. Further, since energy density or an operating voltage of the secondary battery is increased due to improvement of performance of the portable electronic device or the like, it is necessary to secure safety against a volume change of the internal structure.

The above information disclosed in this section is merely for enhancement of understanding of the background of the invention, and therefore it may contain information that does not form the prior art that is already known in this country to a person of ordinary skill in the art.

SUMMARY

The present invention provides a secondary battery having advantages of preventing explosion or the like, caused by an increase in internal pressure of the secondary battery to secure a safe state. The technical problems to be solved by the present invention are not limited to the above-mentioned technical problems, and therefore, other technical problems may be understood by those skilled in the art to which the present invention pertains from the following description.

An exemplary embodiment of the present invention provides a secondary battery that may include an electrode assembly, a case that accommodates the electrode assembly, and a protection member disposed within the case. The protection member may include a curing promoter, an adhesive, and a protective film that separates the curing promoter and the adhesive. Further, the protective film may be configured to be destroyed when pressure is equal to or greater than a predetermined pressure. In particular, the predetermined pressure may be about 0.5 MPa.

According to an exemplary embodiment of the present invention, the curing promoter and the adhesive may contact and react with each other when the protective film is destroyed. In particular, a curing layer may be formed inside the case when a reaction between the curing promoter and the adhesive occurs.

According to an exemplary embodiment of the present invention, the protective film may include one or more materials selected from the group consisting of low density polyethylene (LDPE), high density polyethylene (HDPE), oriented polypropylene (OPP), casting polypropylene (CPP), oriented nylon (ON), casting nylon (CN), and polyethylene terephthalate (PET). The protective film may have a thickness of about 10 μm to 50 μm.

Further, the curing promoter may include one or more materials selected from the group consisting of a polyol, a polyether polyol, and a polyester polyol. The adhesive may include one or more materials selected from the group consisting of toluene diisocyanate (TDI), methylene diphenyl diisocyanate (MDI), hexamethylene diisocyanate (HDI), and isophorone diisocyanate (IPDI). Particularly, a content ratio of the curing promoter and the adhesive may be between about 30:70 and about 70:30.

According to an exemplary embodiment of the present invention, the protective film may include a preliminary breakage part having a thickness less than thicknesses of other portions of the protective film. In particular, the preliminary breakage part may have a line form or a dotted line form. Further, the protective film may include a tube that includes a cross-linking agent therein.

According to the above-described exemplary embodiments, when the pressure inside the secondary battery increases, the protective film may be destroyed before explosion or the like occurs, and the curing promoter and the adhesive may react with each other by contacting each other, thereby forming a curing layer inside the case, and thus the secondary battery may be maintained in a safe state since further expansion or explosion may be prevented.

BRIEF DESCRIPTION OF THE DRAWINGS

A brief description of each drawing is provided to more sufficiently understand drawings used in the detailed description of the present invention.

DETAILED DESCRIPTION

Figure 1:
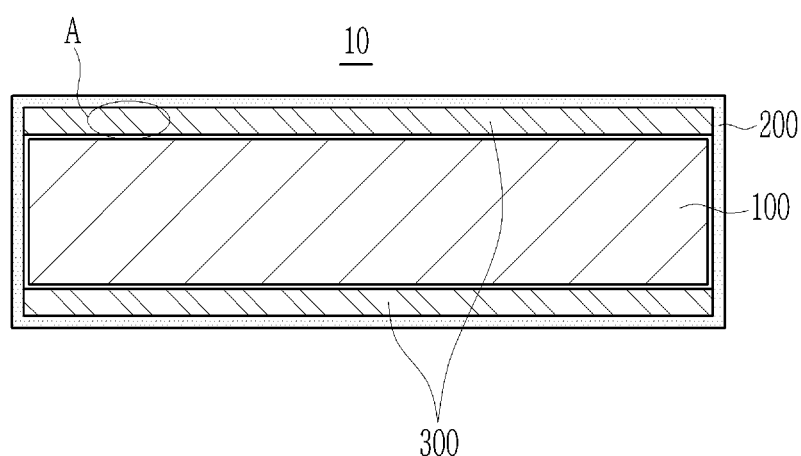
FIG. 1 is a cross-sectional view of a secondary battery according to a first exemplary embodiment of the present invention.

Hereinafter, exemplary embodiments of the present invention will be described in detail with reference to the accompanying drawings to allow those skilled in the art to practice the present invention. The present invention may be implemented in various different forms and is not limited to the examples as described herein.

Portions unrelated to the description may be omitted in order to more clearly describe the present invention, and the same or similar components may be denoted by the same reference numerals throughout the present specification. Further, the size and thickness of each component shown in the drawings may be arbitrarily shown for convenience of explanation, and therefore, the present invention is not necessarily limited to the shown exemplary embodiments in the drawings. In the drawings, the thickness of various layers, regions, etc., may be exaggerated for clarity. In the drawings, the thickness of partial layers and regions may be exaggerated for convenience of explanation.

Further, it will be understood that when an element such as a layer, film, region, or substrate is referred to as being "above" or "on" another element, it may be "directly above" the other element, or intervening elements may also be present. In contrast, when an element is referred to as being "directly above" another element, there are no intervening elements present. Further, when an element is "above" or "on" the reference portion, it may mean that the element is positioned above or below the reference portion, and it may not necessarily mean that the element is "above" or "on" toward an opposite direction of gravity.

In addition, throughout the specification, unless explicitly described to the contrary, the term "comprise" and variations such as "comprises" or "comprising" will be understood to further include other elements rather than excluding other elements. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, in the entire specification, the term "planar phase" means a case in which a target part is viewed from the top, and the term "cross-sectional phase" means a case in which a cross section of the target part that is cut in a vertical direction is viewed from the side.

Hereinafter, a secondary battery according to an exemplary embodiment of the present invention is described in detail with reference to the drawings. The secondary battery according to an exemplary embodiment the present invention may include an electrode assembly and a case that accommodates the electrode assembly. The case may include a protecting member inside, and the protecting member may include a protective film, and a curing promoter and an adhesive which are separated from each other by the protective film.

Hereinafter, a secondary battery according to an exemplary embodiment of the present invention and a protecting member included in the secondary battery are described with reference to the drawings.

FIG. 1 shows a cross section of a secondary battery 10 according to an exemplary embodiment of the present invention. Referring to FIG. 1, the secondary battery 10 according to an exemplary embodiment of the present invention may include an electrode assembly 100, and a case 200 that accommodates the electrode assembly 100. The electrode assembly 100 may include a cathode, an anode, and a separator disposed between the cathode and the anode as a basic structure, and may include a cathode tab that extends from a current collector of the cathode and an anode tab that extends from a current collector of the anode, but the present invention is not limited to this structure.

The case 200 may include a space that accommodates the electrode assembly 100, and may be a pouch type case or a rectangular case, but the present invention is not limited thereto. In the exemplary embodiment, the case 200 may include a protecting member 300 therein. The protecting member 300 may be inserted between the electrode assembly 100 and the case 200 as shown in FIG. 1, but it is not limited thereto and may be disposed corresponding to a side of the electrode assembly 100.

Figure 2:
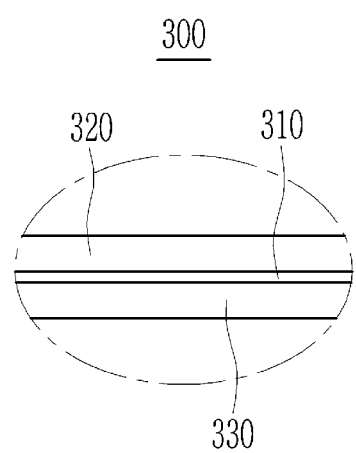
FIG. 2 is an enlarged cross-sectional view of a protecting member according to the first exemplary embodiment of the present invention, showing an enlarged portion A in FIG. 1.

FIG. 2 is an enlarged cross-sectional view of a protecting member 300 according to an exemplary embodiment of the present invention, showing an enlarged portion A in FIG. 1. Referring to FIG. 2, the protecting member 300 may include a protective film 310, and an adhesive 320 and a curing promoter 330 separated from each other by the protective film 310. FIG. 2 shows that the adhesive 320 may be disposed at a side of the case 200 and the curing promoter 330 may be disposed at a side of the electrode assembly 100. However, the present invention is not limited thereto, and the curing promoter 330 may be disposed at a side of the case 200 and the adhesive 320 may be disposed at a side of the electrode assembly 100.

When the adhesive 320 and the curing promoter 330 are separated from each other by the protective film 310 to be prevented from contacting each other as described above, the adhesive 320 and the curing promoter 330 may be prevented from reacting with each other, and the secondary battery 10 may operate normally.

As pressure inside the secondary battery 10 increases, the protective film 310 may be broken when pressure is equal to or greater than a predetermined pressure, for example, about 0.5 MPa. Upon breakage of the protective film 310, the adhesive 320 and the curing promoter 330 may contact each other to generate (e.g., initiate) a reaction. By the reaction of the adhesive 320 and the curing promoter 330, a curing layer may be formed, and an inner wall of the case 100 may be strengthened by the curing layer. Thus, a safe state may be maintained without causing the case 100 to burst due to further volume expansion, explosion, or the like, when a further increase in pressure occurs.

In order for the protective film 310 to break when the pressure is equal to or greater than a predetermined pressure, the protective film may include one or more materials selected from the group consisting of low density polyethylene (LDPE), high density polyethylene (HDPE), oriented polypropylene (OPP), casting polypropylene (CPP), oriented nylon (ON), casting nylon (CN), and polyethylene terephthalate (PET). In addition, the protective film 310 may have a thickness of about 10 μm to 50 μm. When the thickness is less than about 10 μm, the protective film 310 may break even by a minimal impact, and the curing layer may be formed. When the thickness is more than about 50 μm, the protective film 310 may remain unbroken even in a situation where explosion or the like occurs due to a large increase in internal pressure, and thus the curing layer may be unable to be formed.

The adhesive 320 and the curing promoter 330 which contact with each other to generate a reaction due to the destruction of the protective film 310, may be formed as a layer inside the case 200. The adhesive 320 may include one or more materials selected from the group consisting of toluene diisocyanate (TDI), methylene diphenyl diisocyanate (MDI), hexamethylene diisocyanate (HDI), and isophorone diisocyanate (IPDI), and the curing promoter 330 may include one or more materials selected from the group consisting of a polyol, a polyether polyol, and a polyester polyol. A compound such as polyurethane or the like may be formed as the curing layer by the reaction of the adhesive 320 and the curing promoter 330. In order for the adhesive 320 and the curing promoter 330 to react effectively by the contact, a content ratio of the adhesive 320 and the curing promoter 330 may be 30:70 to 70:30.

The adhesive 320 and the curing promoter 330 may be semi-solid materials having a viscosity that ranges from about 10 to about 90000 cP. When a viscosity is low, even when the protective film 310 is not broken, the adhesive 320 or the curing promoter 330 may flow out (e.g., leak) to be reacted. When the viscosity is high, even if the protective film 310 is broken, a sufficient reaction may be unable to be generated between the adhesive 320 and the curing promoter 330, and thus the curing layer may be difficult to be formed.

Since the adhesive 320 and the curing promoter 330 are separated from each other by the protective film 310 under normal operating conditions (e.g., when internal pressure is less than a predetermined pressure), the secondary battery 10 may be operated without forming the curing layer. Conversely, when gas is generated due to various causes in situations such as overcharging, high potential, high temperature storage environment, or the like, and the internal pressure is increased, the protective film 310 may be broken, and the adhesive 320 and the curing promoter 330 may react with each other by the contact, thereby forming the curing layer. Thus, an inner wall of the case 100 may be reinforced to thereby secure safety of the secondary battery without causing the case 100 to burst due to further volume expansion, explosion, or the like, even when a further increase in pressure occurs.

Figure 3:
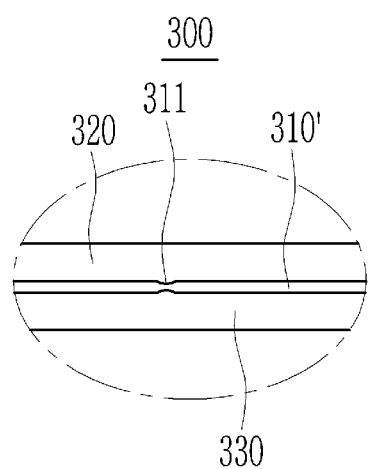
FIG. 3 is an enlarged cross-sectional view of a protecting member according to a second exemplary embodiment of the present invention.

FIG. 3 is an enlarged cross-sectional view of a protection member according to a second exemplary embodiment of the present invention. Referring to FIG. 3, the protective film 310' of the second exemplary embodiment may include a preliminary breakage part 311 having a less thickness than thicknesses of other portions. Since the thickness of the preliminary breakage part 311 is formed to be less than the thicknesses of other portions of the protective film 310', the breakage of the protective film 310' may be more easily induced when the internal pressure is increased. The preliminary breakage part 311 may be formed in a line or a dotted line, and may be provided in plurality. The thickness of the preliminary breakage part 311 may be about 10 μm to 50 μm, but may be less than the thicknesses of the other portions of the protective film 310' within the above range. In the protecting member 300 of secondary battery of the second exemplary embodiment, the remaining structure other than the protective film 310' may be substantially the same as that of the first exemplary embodiment described above.

Figure 4:
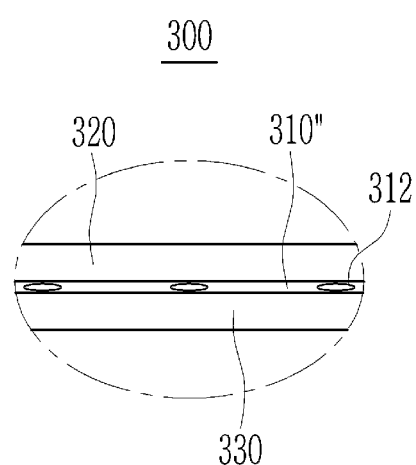
FIG. 4 is an enlarged cross-sectional view of a protecting member according to a third exemplary embodiment of the present invention.

FIG. 4 is an enlarged cross-sectional view of a protection member according to a third exemplary embodiment of the present invention. Referring to FIG. 4, the protective film 310" of the third exemplary embodiment may include at least one cross-linking agent tube 312 including a cross-linking agent therein. The cross-linking agent tube 312 may be formed in a cavity or pore shape within the protective film 310", and may include a material used as a cross-linking agent when a reaction of the adhesive 320 and the curing promoter 330 occurs. The cross-linking agent is not particularly limited, but may include, without limitation, a cross-linking agent generally used when preparing, for example, a polyurethane.

The cross-linking agent tube 312 is configured to be burst when the protective film 310" breaks due to an increase in internal pressure, and thus the cross-linking agent present therein may be released and participate in the reaction of the adhesive 320 and the curing promoter 330. As a result, a cross-linking reaction may be added to form a curing layer more firmly. In the protecting member 300 of secondary battery of the third exemplary embodiment, the remaining structure other than the protective film 310" may be substantially the same as that of the first exemplary embodiment described above.

While the present invention has been described in connection with exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A secondary battery comprising:
   an electrode assembly;
   a case that accommodates the electrode assembly; and
   a protecting member disposed within the case between an outer surface of the electrode assembly and an inner surface of the case,
   wherein the protecting member comprises:
      a curing promoter;
      an adhesive; and
      a protective film that separates the curing promoter and the adhesive, and
   wherein, when the curing promoter and the adhesive are reacted with each other, a curing layer is formed on the inner surface of the case to strengthen the case.

2. The secondary battery of claim 1, wherein the protective film is configured to be destroyed when pressure is equal to or greater than a predetermined pressure.

3. The secondary battery of claim 2, wherein the predetermined pressure is about 0.5 MPa.

4. The secondary battery of claim 2, wherein the curing promoter and the adhesive are configured to contact and react with each other when the protective film is destroyed.

5. The secondary battery of claim 2, wherein the protective film includes one or more materials selected from the group consisting of low density polyethylene (LDPE), high density polyethylene (HDPE), oriented polypropylene (OPP), casting polypropylene (CPP), oriented nylon (ON), casting nylon (CN), and polyethylene terephthalate (PET).

6. The secondary battery of claim 2, wherein the protective film has a thickness of about 10 μm to 50 μm.

7. The secondary battery of claim 1, wherein the curing promoter includes one or more materials selected from the group consisting of a polyol, a polyether polyol, and a polyester polyol.

8. The secondary battery of claim 1, wherein the adhesive includes one or more materials selected from the group consisting of toluene diisocyanate (TDI), methylene diphenyl diisocyanate (MDI), hexamethylene diisocyanate (HDI), and isophorone diisocyanate (IPDI).

9. The secondary battery of claim 1, wherein a content ratio between the curing promoter and the adhesive is between about 30:70 and about 70:30.

10. The secondary battery of claim 1, wherein the protective film includes a preliminary breakage part having a thickness less than thicknesses of other portions of the protective film.

11. The secondary battery of claim 10, wherein the preliminary breakage part includes a line form or a dotted line form.

12. The secondary battery of claim 1, wherein the protective film includes a tube including a cross-linking agent therein.

\* \* \* \* \*